Patented July 19, 1932

1,868,216

UNITED STATES PATENT OFFICE

JOSEPH V. MEIGS, OF JERSEY CITY, NEW JERSEY, ASSIGNOR, BY MESNE ASSIGNMENTS, TO PLASTIX CORPORATION, A CORPORATION OF DELAWARE

RESINOUS PRODUCT AND PROCESS OF MAKING SAME

No Drawing. Application filed January 15, 1927. Serial No. 161,468.

This invention relates to improved resinous reaction products derived from carbohydrates, suitable for commercial use in the manufacture of molding compositions, molded articles, laminated material prepared by hot pressing impregnated or coated sheets of fibrous material, varnishes, etc., all as will be hereinafter more fully described and as claimed.

Resinous reaction products of carbohydrates and phenols are well known. Such resinous products may be produced by heating the carbohydrate with a phenol in the presence of a catalyst. They will be fusible or infusible, according to the conditions under which they are made. If fusible, they may be rendered infusible by suitable heating, particularly in the presence of hardening agents.

One of the common methods of utilizing such resins consists in employing them as binding agents for fibrous, cellular or other suitable material in the preparation of molded or pressed articles for use in the electrical or mechanical arts and in this case the fibrous or other material acts as supporting and extending material for the resin. In their final form such products should for commercial purposes, possess a high degree of resistance to water, heat, mechanical stresses and shocks and electrical influences, i. e., the final product should be as inert as possible and possess a high degree of mechanical strength and toughness.

One of the objects of the present invention is to provide a resinous body of the type mentioned possessing, in comparison with products heretofore produced, an increased degree of resistance to mechanical strains, or shocks. Another object is to minimize the capacity of such products for absorbing water and to render them less susceptible in other respects to the action of water.

Hexamethylenetetramine (often referred to as hexa) will react with carbohydrate-phenolic resins and render them infusible. I have found that carbohydrate-phenolic resinous products prepared with the customary proportions of hexamethylenetetramine are relatively weak from the standpoint of mechanical strength and toughness, i. e., transverse breaking strength and the impact or shock resistance are relatively low.

I have found, however, that by using an increased proportion of hexa, in some cases as much as 20 per cent or more, based on the weight of resin, I can prepare products possessing a greatly increased mechanical strength and toughness. This is quite contrary to what would be expected.

The use of such increased proportions of hexa would be expected to result in mechanical weakness rather than strength, and to give rise to difficulties in hot-pressing and molding, since it is known that hexa normally evolves ammonia in reacting with phenols or resins of the phenol-formaldehyde type. The evolution of a large proportion of ammonia would naturally be regarded as liable to cause blistering and porosity. Nevertheless, I have been able to successfully mold a carbohydrate-phenolic resinous product wherein the proportion of hexa amounted to as much as 30 per cent of the weight of the resin, without difficulty, and have been able to remove the product from the hot mold without resorting to cooling, the resulting product being free from blisters.

I have found that ammonia reacts with carbo-hydrate-phenol resins. This offers a possible explanation for the capacity of such resins to react with large proportions of hexa as described, with the results mentioned.

In order to attain the mechanical strength and toughness desirable in commercial molded or pressed objects of the type herein described, I employ more than 10 per cent of hardening agent, preferably hexamethylenetetramine, based on the weight of carbohydrate-phenol resins used. In employing such increased proportions, I may use them in conjunction with any of the carbohydrate-phenol resins of the prior art but I prefer to employ resins prepared as described in my United States Patent 1,593,342, issued July 20, 1926, and in my copending application Serial No. 92,640, filed March 5, 1926, of which the present application is in part a continuation. As stated therein, the greater the proportion of phenol combined with the carbohydrate or derivatives thereof, the greater is the strength of the resulting resins when hardened with hexa.

The application of the hardening agent to the resin and the utilization of the resulting potentially reactive resinous body may be brought about in accordance with any well known method.

In carrying out the invention in its preferred form I employ a carbohydrate resin which is either fusible, i. e., capable of melting to a liquid consistency, or at least capable of yielding to pressure when heated. The less the viscosity of the resin when heated the greater is the ease with which it may be molded or pressed under heat and pressure, as for example when used as a binder for comminuted filling or supporting material or when employed to impregnate or coat supporting material in sheet form, e. g., woven or felted fabric.

I then incorporate in the resin and hardening agent a filling or supporting material by any known method to secure a composition which when pressed and heated will yield hard, strong, tough coherent masses. During the molding or pressing operation, the fusibility and plasticity of the composition decrease, under the influence of heat, so that the final product is comparatively infusible and thermo rigid. The term heat-set may be applied to such a composition, since the hardening is brought about by further heating, after the initially plastic composition has been shaped and consolidated by pressure or heat and pressure.

In order to present disclosures possessing comparable significance, the discussions herein refer to products made by mixing resin with hexa and wood flour (the proportion and kind of the latter being substantially similar in all compared cases) and heating such composite products under similar conditions of pressure and temperature. That is, the only variable in such cases is the proportion of hexa. Instead of wood flour, other filling or extending material of cellular or fibrous character may be used, viz. ground corn cobs, cotton linters, cotton, wool or silk flock, asbestos; or amorphous or crystalline material such as mica, lampblack, rotton stone; and instead of ground or comminuted fillers, woven or felted fibers in sheet form may be used.

The following comparisons will illustrate the advantages to be obtained by employing the novel proportions of hardening agent herein set forth:

*Example 1.*—A substantially anhydrous solid brittle resin prepared from dextrose and phenol in which the proportion of combined or retained phenol to dextrose taken was approximately 950 to 445 was mixed with varying quantities of hexa and with wood flour and the product "cured" by heat and pressure until it attained its maximum strength. The following data illustrates the effect of increasing proportions of hexa:

| | Maximum transverse breaking strength in pounds per square inch |
|---|---|
| 10 per cent hexa | 9,000 |
| 15 per cent hexa | 11,400 |
| 20 per cent hexa | 13,600 |

At the same time, the maximum impact strength, or shock resistance (which is a measure of toughness) increased from about 0.60 foot pound, in the case when 10 per cent hexa was used, to 0.96 foot pound in the case where 20 per cent hexa was employed.

Another feature of the present invention is based on my discovery that a fatty acid can be reacted with a carbohydrate and a phenol in the presence of a converting agent or catalyzer, as for example sulphuric acid, and by this means a resin prepared which will show an increased degree of resistance toward water, and which when suitably treated, as for example by heating with hexamethylenetetramine, will yield a product possessing an increased shock resistance or impact strength. I may employ the fatty acid in various forms, e. g. in the free state or combined as an ester. The glycerine esters are preferable, i. e., the fatty oils or fats. These may comprise the drying, semi-drying or non-drying oils, for example Chinese wood oil, linseed oil, soya bean oil, corn oil, cotton seed oil, castor oil, or stearine. In addition to the fatty acids specified I may also employ pitches, i. e., the residue from the distillation of fatty acids, as for example, cotton seed pitch, stearine pitch, candle pitch, palm oil pitch. The carbohydrate employed may be soluble or insoluble in water, e. g., dextrose, dextrine, sucrose, starch. A hexose or hexose yielding carbohydrate is preferred, particularly starch or dextrose.

As regards the phenol, ordinary phenol or carbolic acid is preferred, although other phenolic bodies may be employed in some cases, e. g., the cresols and other homologues of phenol, naphthols, guaiacol, polyhydric phenols.

I also employ a converting agent to assist in causing reaction. This is preferably an acidic substance of mineral origin, as for example, sulphuric or phosphoric acid.

This feature of the invention may be utilized as follows:

*Example 2.*—Heat 960 grams of phenol and 13.6 grams of sulphuric acid (sp. gr. 1.83–1.84) to about 130 degrees centigrade and gradually add 240 grams of Chinese wood oil. Allow the solution to cool to about 120 degrees C. and add gradually 400 grams of Argo corn sugar (84 to 85 per cent dextrose, 4 to 5 per cent dextrin and 10 to 11 per cent water and impurities). Apply heat and gradually distill these ingredients, in a vessel provided with an air cooled reflux condenser and a water cooled inclined condenser leading from the top of the reflux condenser. The distillate collected will comprise, in two layers, water containing phenol in solution, and a small amount of phenol containing water in solution. Most of the phenol used will, however, be retained in the reaction mixture by virtue of the reflux condenser. Continue heating and distillation until water ceases to be freely evolved. The temperature of the reactants may be carried to 180 degrees C.–190 degrees C. It will be found that the total water evolved amounts to about 211 grams and the total phenol distilled about 272 grams, corresponding to a retention or combination of 688 grams phenol. The carbohydrate employed contained 85 per cent dextrose and 4 per cent dextrin, or a total carbohydrate content of 89 per cent. The total carbohydrate present was 356 grams. 11 per cent, or 44 grams of moisture was present. The 688 grams of retained phenol is equivalent to 7.32 mols. If this amount condensed with the carbohydrate, 7.32 mols of water or 131.76 grams would be theoretically produced which, added to the 44 grams of water present in the carbohydrate, equals 175.76 grams. The amount of water actually obtained exceeds this quantity and is also greater than half the quantity of carbohydrate taken. Now, by further distillation, preferably assisted by a partial vacuum, remove 238 grams of phenol, maintaining a proper temperature, say 150° C.–180° C.

The residue is liquid at temperatures not above 200° C., and at room temperature is solid, brittle, easily pulverizable, homogeneous, black in mass, brown or red in thin layers, soluble in alcohol, insoluble in water, partially soluble in sodium hydroxide solution, soluble in alcohol, alcohol-acetone, or alcohol-benzol mixtures, and not readily soluble in benzol, turpentine or gasoline. By heating to 230°–260° C. it is changed from a liquid to a jelly-like consistency, i. e. it becomes infusible but not necessarily rigid. It is not soluble in ammonium hydroxide, but is decomposed by this reagent.

That the oil actually reacted with the carbohydrate, phenol and sulphuric acid under the conditions above described is indicated by the fact that the resulting resin can be dissolved in alcohol without a residue, whereas Chinese wood oil is not compatible with or soluble in this solvent.

This resin possesses several advantages over the carbohydrate-phenol resins heretofore produced. It possesses an increased resistance toward water and may be soaked in water without losing its gloss. After thorough incorporation with wood flour and hexa in any well known manner, the resulting molding compound possesses an increased plasticity or capacity to "flow" during hot-molding processes, even when the resin contains little or no free phenol.

It has the particular advantage that wood flour or molding compositions may be prepared therefrom which yield molded articles possessing an increased shock resistance or impact strength.

A binder mixture was made containing the resin prepared as above described and 20 per cent. of its weight of hexa. This was mixed with substantially the same proportion of wood flour as used in molding mixtures hereinabove described under Example 1 and was subjected to the same heating and pressure conditions. The maximum impact strength of the resulting product was 1.12 foot pounds.

Another mixture was prepared differing from the above only in that 15 per cent. of hexa was used instead of 20 per cent. The maximum impact strength of products of this mixture was 0.95 foot pound.

It is to be clearly understood that the proportions and kind of reacting substances may be varied within the scope of the claims without departing from the invention. This is particularly true with respect to the fatty oil, fat or fatty acid, employed. By such variation the properties of the product may be changed. For example, by using larger proportions of oil, a softer, less brittle, and more difficultly pulverized resin will be produced. Such a product may be less readily soluble in alcohol than the product described in the above example and may require a mixture of alcohol and benzol, or acetone and benzol, or other solvents, for its complete solution. A product of this character will possess still greater fluidity, or less viscosity, when heated and therefore be more particularly adapted for impregnating purposes.

For purposes where a high degree of resistance to impact (toughness) is required, I preferably employ the drying or semi-drying oils, or fatty acids therefrom, e. g. linseed oil, Chinese wood oil, perilla oil, corn oil, soya bean oil. Such oils are also preferably employed in cases where it is especially desirable that the resin be capable of becoming infusible by heating without chemical hardening agents, as for example, in preparing mixtures for cold molding.

In some cases, the use of a less unsaturated, or even fully saturated oil, is desirable. In such cases, stearine may be used.

Whatever oil, fat, fatty pitch, or fatty acid is used, it may be heated with a carbohydrate, a phenol and a converting agent, as described above in connection with Chinese wood oil, to yield a resin possessing one or more improved properties (e. g., resistance to the action of water, fluidity when suitably heated, capacity to yield tough molded or pressed products).

To recapitulate, by employing more than 10 per cent. of hexa with a carbohydrate phenol resin, I have been able to prepare molded wood flour products possessing greatly increased mechanical strength and toughness, more specifically, impact strength greater than 0.60 foot pounds and a transverse breaking strength in excess of 9000 pounds per sq. inch. This improvement may be enhanced by employing also a suitable fatty acid, as described.

The tests for transverse breaking strength used to determine the values disclosed herein were made according to the method described in the American Society for Testing Materials Standards, 1924, D 48—24, page 1063.

In testing for impact strength, a Charpy type machine was used with a capacity of 3 foot pounds. The specimens were rectangular unnotched bars, 5" x ½" x ½". The blow was struck parallel to the line of molding pressure and at a velocity of 11.3 feet per second. For further details concerning this test, see the 1926 Book of American Society for Testing Materials Tentative Standards, under the serial designation D 256–26T, and for more specific details see a paper by Werring in the Proceedings of the American Society for Testing Materials for 1926. Inasmuch as the results of such a test depend on the particular method used, the size and shape of specimen, and other details, a specific method must be employed in order that the results may be truly significant. The figures for impact strength described in the present specification and claims were obtained by proceeding according to the method referred to.

It is probable that the necessity for employing the novel and unusually large proportions of methylene hardening agent disclosed herein, in order to attain the high degree of mechanical strength and toughness described, is due to the capacity of the carbohydrate phenol resins to react with the hardening agent for reasons other than the presence of phenolic groups in the resins.

That is to say, it is probable that an agent like hexa reacts not only with the phenolic portion of the resin but also with that portion which is derived from the carbohydrate.

It is well known that humic acid and levulinic acid are formed by the action of mineral acids on carbohydrates.

It is quite likely that some humic or levulinic acid is produced when carbohydrates are heated with phenols and acid catalysts and that such humic or levulinic acid forms a part of the resulting resins.

Humic and levulinic acids react very readily with ammonia (which is produced when hexa acts on phenol or phenolic bodies) and probably also with the methylene groups or formaldehyde yielded by the hexa. It is highly probable that very considerable amounts of hexa can be used, with the advantages described, because of the reaction of the hexa, not only with the phenolic portion of the resin, but also with that portion consisting of carbohydrate derivatives including humic and levulinic acid.

In the case of formaldehyde phenol resins, hexa is used to harden soft or fusible resins and in so doing merely supplies a quantity of formaldehyde in addition to that already present (or used) in the fusible resin. Ammonia is freely evolved when hexa acts on a formaldehyde phenol resin. It is mainly the formaldehyde of the hexa that reacts. Ammonia is not freely evolved when hexa acts on a carbohydrate phenol resin, according to my experience. Much of it is retained. The action of hexa on the carbohydrate phenol resins appears to be quite different from its action on the well known formaldehyde phenol resins.

By the term hexamethylenetetramine, or hexa, I mean to include not only this specific substance, but also any condensation product produced by the action on formaldehyde, or polymers thereof, of ammonia or aliphatic amines. Instead of hexamethylenetetramine, I may employ in some cases a hardening agent such as, for example, mixtures of paraformaldehyde and ammonium carbonate, and also condensation products of formaldehyde (or other aldehyde) with aromatic amines, as for example, with aniline, toluidine, paraphenylene diamine, etc.

What I claim is:

1. A resinous product, adapted to yield a strong, hard, tough, heat-set product when heated with more than 10 per cent. of hexamethylenetetramine, comprising the resinous reaction product of a carbohydrate, a phenol and Chinese wood oil.

2. The resinous reaction product of a carbohydrate, a phenol and a fatty oil, which product is insoluble in water or gasoline, soluble in alcohol or a mixture of benzol and alcohol and capable of becoming infusible when heated to a high temperature.

3. The process which comprises reacting with heat, a phenol, a carbohydrate, and Chinese wood oil, to produce a potentially reactive resin.

4. The process which comprises reacting with heat, a phenol, a carbohydrate, and Chinese wood oil to produce a potentially reactive resin, and heating the resin with hexamethylenetetramine.

5. The process which comprises reacting with heat, a phenol, a carbohydrate, and Chinese wood oil to produce a potentially reactive resin, and heating the resin with hexamethylenetetramine in an amount greater than ten per cent. of the resin.

6. A resinous product adapted to yield a hard, strong, tough heat-set product when heated with more than ten percent by weight of hexamethylenetetramine comprising a resinous reaction product of a carbohydrate, a phenol and an unsaturated fatty oil.

7. The process which comprises reacting with heat a phenol, a carbohydrate, and a fatty oil to produce a potentially reactive resin, and heating said resin with hexamethylenetetramine.

8. The process which comprises reacting with heat a phenol, a carbohydrate, and a fatty oil to produce a potentially reactive resin, and heating said resin with hexamethylenetetramine in an amount greater than ten percent by weight of the resin.

9. A resinous product adapted to yield a hard, strong, tough heat-set product when heated with more than ten per cent by weight of hexamethylenetetramine comprising a resinous reaction product of a carbohydrate, a phenol and an unsaturated fatty glyceride.

10. The process which comprises reacting by heat a phenol, a carbohydrate and a fatty glyceride to produce a resinous product and heating the same with a hardening agent.

11. A composition comprising the heated reaction product of phenol and dextrose condensed in proportions of substantially 950 parts phenol to 445 parts dextrose with hexamethylenetetramine in an amount between ten per cent and twenty per cent of the condensed phenol and dextrose.

12. Method of making a hard, infusible resinous product which comprises condensing a phenol and dextrose to give a primary resin in which the retained phenol is substantially 950 parts to 445 parts dextrose and mixing with this resin hexamethylenetetramine in an amount between ten per cent and twenty per cent, by weight, of the resin.

JOSEPH V. MEIGS.